United States Patent
Fujii

[15] 3,668,994
[45] June 13, 1972

[54] AUTOMATIC DIAPHRAGM APERTURE ADJUSTING DEVICE FOR FLASH PHOTOGRAPHY IN CAMERA WITH INTERCHANGEABLE LENS

[72] Inventor: Yoshifusa Fujii, Kaizuka, Japan
[73] Assignee: Minolta Camera Kabushik Kaisha, Minamiku, Osaka, Japan
[22] Filed: Nov. 24, 1969
[21] Appl. No.: 879,014

[30] Foreign Application Priority Data
Nov. 25, 1968 Japan...................43/86242

[52] U.S. Cl..................95/64 A, 95/10 C, 95/44
[51] Int. Cl..................G03b 7/16, G03b 9/02, G03b 17/14
[58] Field of Search..................95/10 C, 64 R, 64 A, 44 R

[56] References Cited
UNITED STATES PATENTS

| | | |
|---|---|---|
| 3,443,496 | 5/1969 | Sauer et al.................95/11 |
| 3,082,672 | 3/1963 | Swarofsky et al..................95/10 C |
| 3,228,314 | 1/1966 | Koppen..................95/44 X |
| 3,358,571 | 12/1967 | Lange..................95/10 C |
| 3,443,496 | 5/1969 | Sauer et al..................95/10 C X |
| 3,464,333 | 9/1969 | Aoki et al..................95/10 C |
| 3,529,524 | 9/1970 | Ueda..................95/10 C |

Primary Examiner—Joseph F. Peters, Jr.
Attorney—Stanley Wolder

[57] ABSTRACT

A diaphragm aperture adjusting device automatically detects the displacement of the inner cylinder of an interchangeable lens which is set to a distance value for focusing. The diaphragm aperture of the lens is automatically controlled to the value in accordance with the displacement of the inner lens cylinder by adjusting members for flash photography provided in the camera body. When various interchangeable lenses with different axial displacements are employed, the adjustment to compensate for the difference is made to provide proper aperture values.

5 Claims, 6 Drawing Figures

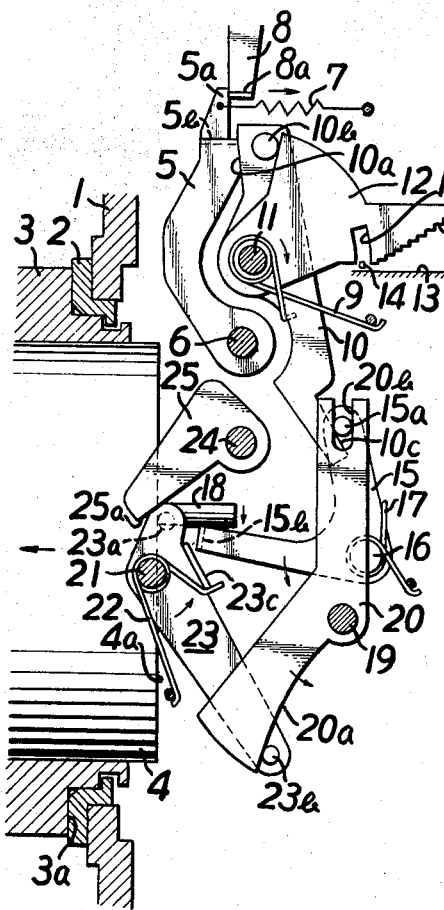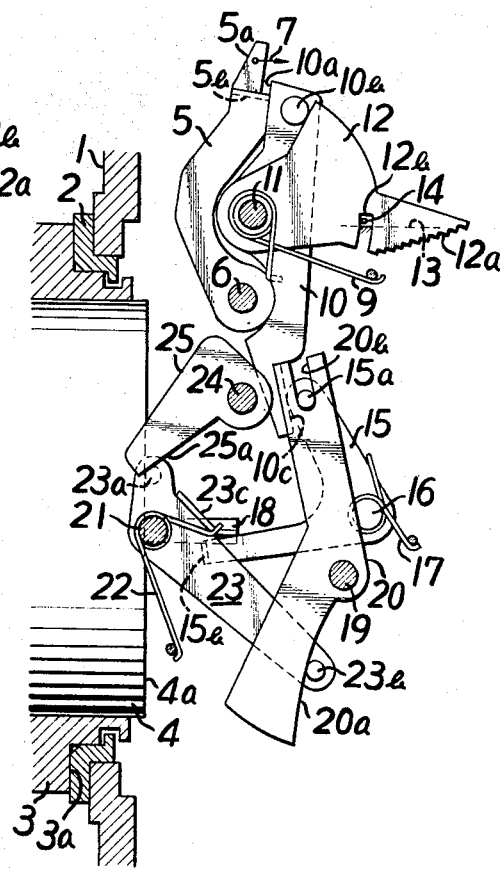

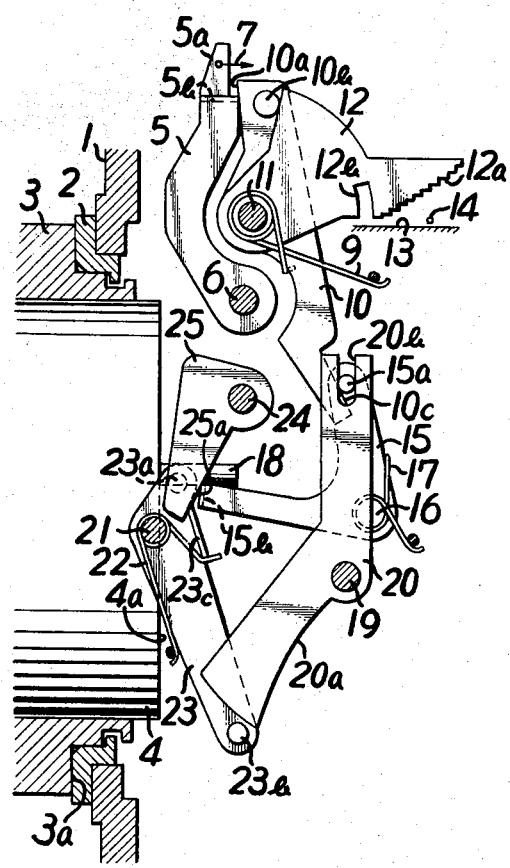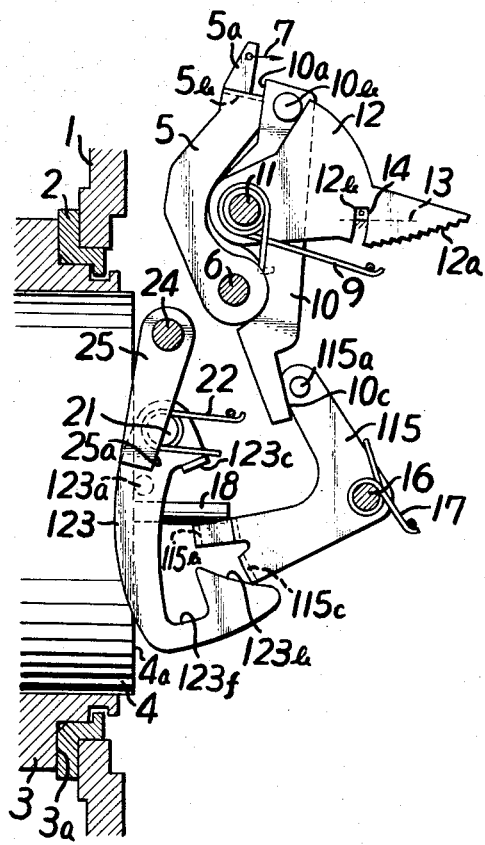

INVENTOR
YOSHIFUSA FUJII
BY Stanley Wolder
ATTORNEY

3,668,994

AUTOMATIC DIAPHRAGM APERTURE ADJUSTING DEVICE FOR FLASH PHOTOGRAPHY IN CAMERA WITH INTERCHANGEABLE LENS

BACKGROUND OF THE INVENTION

The present invention relates to a device for automatically adjusting the diaphragm aperture for flash photography to be used in a camera with an interchangeable lens and more particularly to an automatic diaphragm aperture adjusting device in a camera which is adapted for an interchangeable lens such as a wide angle, standard or telephoto lens. In taking flash photographs, the device of the present invention is capable of automatically setting an appropriate diaphragm aperture value interrelatedly with focusing of the lens, the device further being so adapted that when ordinary photographs are to be taken without the use of flash, the interrelating mechanism is freed from the operative relation with the diaphragm operating mechanism and that diaphragm aperture setting can be made as desired or the aperture value can be automatically set in operative relationship with automatic exposure control means.

With conventional cameras with an interchangeable lenses, most of those provided with an automatic diaphragm aperture adjusting device for flash photography have the adjusting device only on the lens assembly, so that there is a need to provide the automatic diaphragm aperture adjusting device for flash photography in each of the interchangeable lenses. In addition, in the case where the camera is provided with a diaphragm device for automatically setting the diaphragm aperture of the lens at the time of taking an ordinary photograph, an interconnecting member has to be mounted on the lens assembly to associate the diaphragm mechanism on the lens assembly with the diaphragm actuating mechanism in the camera body; hence a drawback that the mechanism provided on the lens mount as well as the over-all camera structure becomes complex. Especially when the above-mentioned mechanism is provided in the lens mount which has only a limited space, a great deal of troubles are encountered in assembly and manufacture, while the provision of a particular space in the lens mount makes it seriously difficult to provide a desired structure in designing the lens as well as various mechanisms of the camera.

Summary of the Invention

An object of the present invention is to eliminate the above-mentioned structural drawbacks, to simplify the structure of an automatic diaphragm aperture adjusting device for flash photography to be used in a camera with an interchangeable lens, to overcome various difficulties encountered in the assembly and manufacture of the lens and camera body and to make the lens and mechanisms exceedingly easy to design in desired manner.

Another object of the present invention is to provide an automatic diaphragm aperture adjusting device for flash photography which utilizes part of the automatic diaphragm operating mechanism already incorporated in the camera body or part of the built-in automatic exposure mechanism for automatically setting the exposure value interrelatedly with the exposure meter so that the device can be constructed with a minimum number of constituent elements.

Another object of the present invention is to provide a device which can be used in a camera adapted for use with various interchangeable lenses different in axial displacement such as wide angle, standard, telephoto lenses and the like and yet which is capable of automatically detecting the displacement, compensating for the difference in displacement and setting proper diaphragm aperture values.

Still another object of the present invention is to provide very simple switching means by which the operation of the camera can be readily changed over from the automatic diaphragm operating mechanism for ordinary photography to automatic diaphragm adjusting device for flash photography.

In accordance with the objects of the present invention described, the camera body is provided in its interior with flash adjusting means which functions to control the diaphragm aperture setting operation of a diaphragm actuating member in diaphragm operating means of an interchangeable lens while detecting the axial displacement of the inner cylinder of the lens so as to make the displacement of the inner lens cylinder correspond to the diaphragm aperture value of the lens. Accordingly, there is no need to provide the lens assembly with any automatic diaphragm adjusting member for flash photography, but the rear end of the inner lens cylinder to be moved backward or forward by distance control operation has only to be exposed to the interior of the camera body for contact with the lens displacement detecting member of the flash adjusting means. In providing the automatic diaphragm aperture adjusting device for flash photography, such structure serves to eliminate the disadvantage to dispose a specific member in the lens mount and enhances the ease to provide the lens and mechanisms in desired design. The flash adjusting means, being composed of a very small number of levers, pins and a cam formed on the lever, is simple in construction and there arise no difficulties in making and assembling the lens and camera body.

Further in accordance with the present invention, a set lever which can be turned from the outside of the camera body is provided, the actuating end of the set lever being disposed in engageable relationship with the flash adjusting means. When the set lever is turned in one direction, the detecting portion of the flash adjusting means is brought into contact with the rear end of the inner lens cylinder to make automatic diaphragm aperture adjustment for flash photography, while when the set lever is rotated in the opposite direction, the flash adjusting means is moved out of relationship with the axial movement of the inner lens cylinder. The set lever is turned when flash photography is to be made and when flash photographing operation is to be switched to operation to take ordinary photographs. There is no trouble in performing this procedure.

In order to insure accurate operation of the automatic diaphragm aperture adjusting device to be used in flash photography for various interchangeable lenses which are different in axial displacement, a compensation cam in accordance with the displacement of each lens is formed in the rear end edge of the inner lens cylinder. The compensation cam is provided by a small cutout formed in the rear end portion of the inner lens cylinder. The flash adjusting means is so constructed as to operate through a compensation member engaged with the cutout and compensating for the position of the detecting portion thereof. In accordance with the position and shape of the compensation cam, the compensation member compensates for the position of the detecting portion of the flash adjusting means and varies the rotational ratio of the respective levers depending upon the kind of the interchangeable lens and its displacement. As a result, the diaphragm aperture value automatically set for flash photography provides proper exposure value all the time.

BRIEF DESCRIPTION OF THE DRAWINGS

FIG. 1 is a view showing the structure of the principal part of an embodiment of the present invention as it is set for flash photography;

FIG. 2 is a view of the same part shown in FIG. 1 after distance setting and shutter release;

FIG. 3 is a view of the same after automatic diaphragm aperture setting for flash photography has been relieved and the part is set for taking ordinary photographs in accordance with the indication of the exposure meter;

FIG. 4 is a view showing another embodiment obtained by modifying part of the foregoing embodiment of the automatic diaphragm aperture adjusting device for flash photography, as shutter has been released in the device set for flash photography;

DETAILED DESCRIPTION OF THE PREFERRED EMBODIMENTS

Figure 5:
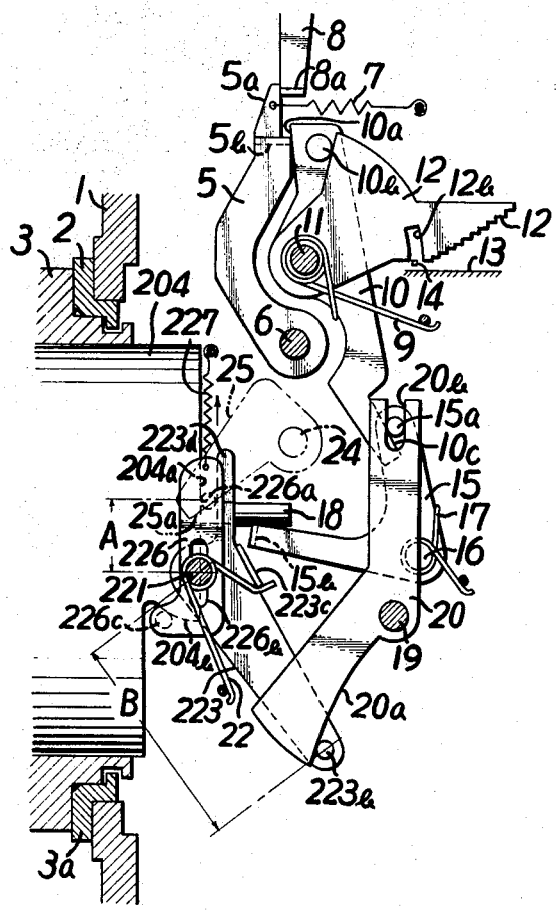
FIG. 5 is a view showing an embodiment for use in a camera adapted for interchangeable lenses which are different in the axial displacement of the inner lens cylinder, the embodiment being provided with means for compensating for the displacement of the inner lens cylinder.

Referring to FIGS. 1, 2 and 3, designated at 1 is part of front plate of the camera body which is provided with a washer member 2 such as a bayonet mount for the lens mount. An outer lens cylinder 3 is fit in the washer member 2 at its rear end to provide a bayonet mount or the like for fixing the outer lens cylinder 3 in position. The contact surface 3a is in snag-fit contact with the front face of the washer member 2. Supported on the outer lens cylinder 3 in axially movable manner is an inner lens cylinder 4 whose rear end projects into the camera body from the outer lens cylinder 3, the inner lens cylinder 4 being adapted to be moved backward or forward in the outer lens cylinder 3 when distance control, namely focusing is made.

Designated at 5 is an associated lever to be moved interrelatedly with shutter release. The lever 5 is mounted on a pivot 6 on the camera body and urged by a spring 7 in the clockwise direction as indicated by an arrow in the drawing. Indicated at 8 is a release member adapted to be actuated upon shutter release and having a bent end 8a engaged with the end 5a of the associated lever 5. Simultaneously when the shutter is released, the release member 8 is retracted to permit the bent end 8a to be disengaged from the end 5a of the associated lever 5, whereby the associated lever 5 is turned in the clockwise direction about the pivot 6 due to the action of the spring 7. The restoring movement of the associated lever 5, namely the counterclockwise rotation of the lever to return to the position shown in FIG. 1 after the above-mentioned pivotal movement is effected in known manner by an unillustrated mechanism upon shutter setting or upon completion of exposure. When the lever 5 is returned to the original position, the bent end 8a of the release member 8 is brought into engagement with the end 5a of the associated lever 5 to prevent its clockwise movement until subsequent shutter release is made. The associated lever 5 is further formed with a lug 5b to contact a side portion 10a of a control lever 10 which is urged in the counterclockwise direction by a spring 9 so that the control lever 10 is moved, by the clockwise rotation described above, about a pivot 11 in clockwise direction against the action of the spring 9. Further mounted on the pivot 11 is an automatic exposure cam 12 which is pushed by a pin 10b on the control lever 10, the cam 12 thus being adapted for pivotal movement together with the control lever 10. The automatic exposure cam 12 is formed with a cam 12a in steplike shape disposed close to the fixed plane 13 of the camera body. Interposed between the steplike cam 12a and fixed plane 13 is a pointer 14 of the exposure meter which is adapted to be pressed against the fixed plane 13 by the steplike cam 12a when automatic exposure photographs are taken without the use of flash. That is to say, the position of the pointer 14 defines the clockwise displacement of the automatic exposure cam 12 and accordingly the position also defines the rotational displacement of the control lever 10. In this manner, the diaphragm aperture value at the time of automatic exposure photography is determined automatically by means of a mechanism to be described later.

Designated at 15 is a diaphragm lever mounted on a pivot 16 on the camera body and urged counterclockwise by a spring 17. An upstanding pin 15a at one end of the lever 15 is engaged with the tail end 10c of the control lever 10. When the control lever 10 is pivotally moved in the clockwise direction as described above, the diaphragm lever 15 follows the tail end 10c of the control lever 10 under the action of the spring 17 and turns in the counterclockwise direction to permit a diaphragm pin 18 in contact with a lug 15b at the other end of the diaphragm lever 15 to move in the direction indicated by an arrow in FIG. 1. Thus, the diaphragm aperture is reduced in accordance with the rotational displacement of the automatic exposure cam 12. Since the amount of rotation of the cam 12 is defined by the position to which the pointer 14 is deflected, a proper diaphragm aperture value can be obtained for automatic exposure photography and an exposure is made upon shutter release. When exposure is completed, the diaphragm pin 18 is returned to the position in FIG. 1 by a known mechanism and the diaphragm is restored to the open position.

Described above is an automatic diaphragm aperture adjusting mechanism known in the art adapted for the camera with an interchangeable lens and employing an automatic exposure adjusting device. Since the present invention utilizes part of the automatic diaphragm aperture adjusting mechanism, the structure embodying the present invention can be made very simplified. Further the present invention requires no special skill when it is incorporated in a camera as part of the known automatic diaphragm aperture adjusting mechanism.

In applying the present invention to a camera with an automatic exposure adjusting device, the automatic exposure cam 12 must be so designed that the pointer 14 of the exposure meter may not be pressed against the fixed plane 13 by the cam, because flash photography does not require the indication of exposure amount given by the pointer 14. Another reason is that in the case where the pointer 14 prevents pivotal movement of the automatic exposure cam 12, the diaphragm aperture value is controlled by the exposure meter and it becomes no longer possible to reduce the diaphragm aperture to the desired value in flash photography. Accordingly, in such case, there is provided a change-over switch by which the power source circuit of the exposure meter is opened simultaneously when the camera is set for flash photography to bring the pointer 14 to the zero position. Furthermore, at the portion corresponding to the zero position of the pointer 14, the automatic exposure cam 12 is formed with a cutout 12b for leaving the pointer undisturbed so that the pointer 14 located at the zero position may not prevent the movement of the automatic exposure cam 12. It will be apparent in FIG. 2 that such structure enables the cam 12 to turn free of interference with the pointer 14, with the result that the amount of pivotal movement of the control lever 10 to be effected upon shutter release can be defined by the automatic diaphragm aperture adjusting members for flash photography to be described later and the diaphragm aperture setting can be obtained in accordance with the distance to the subject.

The rotational displacement of the control lever 10 and diaphragm lever 15 which are free of interference with the pointer 14 is determined by two levers, namely, by an automatic flash cam lever 20 mounted on a pivot 19 and by a flash adjusting lever 23 mounted on a pivot 21 and urged in the counterclockwise direction by a spring 22, the diaphragm aperture thus being adapted to be set at a value in accordance with the distance to the subject at the time of flash photography. The automatic flash cam lever 20 is provided with an automatic flash cam portion 20a and a crotch 20b to receive the pin 15a on the diaphragm lever 15, the arrangement being such that the diaphragm lever 15 and the cam lever 20 may be moved pivotally in the same direction in interrelated manner. As illustrated in the drawing, the shape of the cam portion 20a is provided by a nonlinear concave edge the curve of which is appropriately determined by the displacement of the inner lens cylinder 4 to be effected in distance control and the amount of diaphragm aperture reduction by the diaphragm blades. On the other hand, the flash adjusting lever 23 mounted on the pivot 21 on the camera body has a follower pin 23a at one end which is urged into contact with the rear end face 4a of the inner lens cylinder 4 by the action of a spring 22. In response to the forward or backward movement, namely axial displacement, of the inner lens cylinder 4, the flash adjusting lever 23 is therefore turned about the pivot 21.

The tail end of the flash adjusting lever 23 is provided with a control pin 23b which, while the follower pin 23a is kept in contact with the rear end face 4a of the inner lens cylinder 4, is in contact with the cam portion 20a of the automatic flash cam lever 20 so as to limit the amount of the counterclockwise movement of the cam lever 20 and the diaphragm lever 15 operatively associated therewith in accordance with the displacement of the inner lens cylinder 4.

In the state in FIG. 1 set for flash photography the inner lens cylinder 4 is moved forward as indicated by the arrow when focusing is made. Accordingly, the flash adjusting lever 23 whose follower pin 23a is in contact with the rear end face 4a of the lens cylinder 4 is pivotally moved in the counterclockwise direction about the pivot 21 under the action of the spring 22 and stopped at the position corresponding to the displacement of the inner lens cylinder 4 upon the completion of focusing. If the shutter is released in this position, the diaphragm lever 15 is moved in the counterclockwise direction about the pivot 16 as already described. However, since the automatic flash cam lever 20 is also moved counterclockwise about the pivot 19 together with the diaphragm lever 15, the cam portion 20a of the automatic flash cam lever 20 strikes the control pin 23a at the tail end of the flash adjusting lever 23, with the result that the pivotal movement of the cam lever is prevented and that of the diaphragm lever 15 is also stopped to bring about the state shown in FIG. 2. That is to say, the diaphragm pin 18 reduces the diaphragm aperture in accordance with the pivotal displacement of the diaphragm lever 15, so that the aperture value at this time corresponds to the axial displacement of the inner lens cylinder 4, namely, to the distance to the subject. The diaphragm aperture value in flash photography is determined by the guide number of the flash bulb and distance. Where the guide number is constant, the aperture value is a function of the distance.

In order to switch the operation from flash photography to automatic exposure photography or ordinary photographing operation without use of flash, or vice versa, a set lever 25 is fixedly mounted, as shown in FIGS. 1 and 3, on a pivot 24 which is rotated by an unillustrated operating member exposed outwardly from the camera body. The end of the set lever 25 is adapted to move into engagement with a bent portion 23c of the flash adjusting lever 23. It is convenient to provide the set lever 25 or part of the pivot 24 with a changeover switch for changing over the circuit from the power source circuit of the exposure meter to the power source circuit for flash photography every time the operation is switched from automatic exposure photography to flash photography.

Referring to the state shown in FIG. 1, when the pivot 24 is turned in the counterclockwise direction by the external operating member, the end 25a of the set lever 25 contacts the bent portion 23c of the flash adjusting lever 23 and turns the lever 23 in the clockwise direction against the action of the spring 22. The follower pin 23a is consequently moved out of contact with the rear end face 4a of the inner lens cylinder 4 and the control pin 23b at the tail end of the flash adjusting lever 23 gets retracted from the front side of the cam portion 20a of the automatic flash cam lever 20 as shown in FIG. 3, the cam lever 20 thus being made free to turn independently of the flash adjusting lever 23. On the other hand, the power source circuit of the exposure meter is closed and the pointer 4 deflects rightward in the drawing in accordance with the amount of light received by the exposure. Since the cam lever 20 is no longer under the control of the flash adjusting lever 23, the diaphragm lever 15 is now controlled by the automatic exposure cam 12 in its pivotal movement. When the shutter is released in the state shown in FIG. 3, therefore, an automatic exposure photograph which is controlled by the deflection of the pointer 14 is taken. FIG. 3 shows the parts as they are set for automatic exposure photography.

To switch the camera from the position set for automatic exposure photography to flash photography operation, the pivot 24 is turned clockwise from the state in FIG. 3 to that shown in FIG. 1. With this movement, the set lever 25 is pivotally moved clockwise together with the pivot 24 to free the end 25a from pressing engagement with the flash adjusting lever 23, which is accordingly rotated counterclockwise about the pivot 21 under the action of the spring 22 to engage the follower pin 23a with the rear end face 4a of the inner lens cylinder 4 and to bring the control pin 23b into contact with the cam portion 20a of the automatic flash cam lever 20 as shown in FIG. 1.

In case of a camera with an automatic diaphragm mechanism of common type which has no automatic exposure system (i.e. a mechanism in which the diaphragm aperture is left open except when it is reduced to a specified value only during the period between shutter release and completion of exposure), the automatic exposure cam 12 is omitted and the diaphragm aperture control is made manually in taking ordinary photographs. In this case, the automatic flash cam lever 20 is operatively associated with the diaphragm lever 15.

In the foregoing embodiment, the automatic flash cam lever 20 and diaphragm lever 15 are pivotally moved in the same direction simultaneously when the shutter is released as well as when shutter setting is made. For this reason, it is possible to provide these two members as a single member. FIG. 4 shows an embodiment in which the automatic flash adjusting lever 20 in the foregoing embodiment is omitted, the diaphragm lever 115 serving as a diaphragm lever and automatic flash adjusting lever. The members similar to those in the embodiment in FIGS. 1 to 3 are indicated by similar reference numerals.

Referring to FIG. 4, a flash adjusting lever 123 is pivotally mounted in the camera body on the pivot 21 at its one end and urged clockwise by the spring 22, a follower pin 123a on the lever 123 being in engagement with the rear end face 4a of the inner lens cylinder 4 so that the flash adjusting lever 123 may be moved about the pivot 21 in accordance with the displacement of the inner lens cylinder 4. It will be seen in the drawing that the other end of the flash adjusting lever 123 is bent in a hooklike shape with a cam portion 123b formed along its end, a recess 123f being formed in the bent portion. On the other hand, the diaphragm lever 115 is provided with a bent end 115c to be brought into contact with the cam portion 123b of the flash adjusting lever 123, in addition to a pin 115a to follow the control lever 10 and a lug 115b to move the diaphragm pin 18 in the diaphragm aperture reducing direction. When the axial movement (i.e. distance control) of the inner lens cylinder 4 is made, the turning of the flash adjusting lever 123 thereby effected shifts the relationship in position between the cam portion 123b and the bent end 115c of the diaphragm lever 115 in accordance with the displacement of the inner lens cylinder 4. Upon shutter release being made after the distance control, the diaphragm lever 115 is turned about the pivot 16 in the counterclockwise direction to cause the lug 115c at its end to strike the cam portion 123b of the lever 123, whereupon the diaphragm lever 115 is stopped. The diaphragm pin 18, following the movement of the lug 115b of the diaphragm lever 115, moves the diaphragm blades to reduce the aperture. The aperture size thus provided corresponds to the axial displacement of the inner lens cylinder 4. Although FIG. 4 shows the state after the shutter release has been made and the position of the parts as the shutter is in cocked position is not shown, the diaphragm lever 115, while the shutter is cocked, is located in the position corresponding to that of the diaphragm lever 15 in FIG. 1 with the bent end 115c spaced apart from the cam portion 123b of the flash adjusting lever 123.

Referring to FIG. 4, the set lever 25 is turned counterclockwise by an actuating member provided externally of the camera body when flash photographs are not taken. This movement causes the end 25a of the set lever 25 to push the bent portion 123c of the flash adjusting lever 123 to such a position that the bent end 115c of the diaphragm lever 115 can be urged into the recess 123f of the flash adjusting lever 123. When the shutter release is made in this state, the diaphragm lever 115 will be moved counterclockwise, but the bent end 115c does not strike the flash adjusting lever 123 but moves into the recess 123f, the diaphragm lever 115 thus being left independent of the flash adjusting lever 123.

Figure 6:
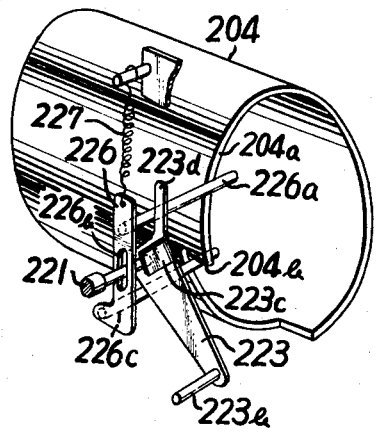
FIG. 6 is a perspective view showing part of FIG. 5 and intended for the better understanding of the structure.

It will be understood from the description above that in flash photograph taking operation the present device automatically adjusts the diaphragm aperture to the proper value which is appropriate to flash photography upon detecting the axial displacement of the inner lens cylinder, namely upon detecting focusing of the lens. However, with interchangeable lenses with different photographing distances and varying displacements, there is a need to provide each of the lenses with means for compensating for the difference in displacement if the present device is to be employed as it is, whereas it is quite disadvantageous to mount the compensation means in each of the lens mounts since the space is limited and great difficulties are therefore encountered in design, assembly and manufacture. FIGS. 5 and 6 illustrate an embodiment of a device which is most useful in such application.

Referring to FIGS. 5 and 6 in which the parts similar to those in FIGS. 1 to 4 are indicated by similar reference numerals, a follower pin 226a to be kept in contact with the rear end face 204a of the inner lens cylinder 204, instead of being fixed to a flash adjusting lever 223, is provided on a compensation plate 226 which is formed with a slot 226b. A pivot 221 supporting the flash adjusting lever 223 extends through the slot 226b in the compensation plate 226 to allow the plate 226 to move freely along the slot 226b. By means of a tension spring 227, the compensation plate 226 is urged upward as seen in the drawings. The compensation plate 226 is further provided, at its tail end, with a compensation pin 226c which is urged by the tension spring 227 into sliding contact with a compensation cam 204b provided by a cut-out portion in the rear end of the inner lens cylinder 204. The flash adjusting lever 223 has an arm 223d pressed against the follower pin 226 under the action of the spring 22 which biases the flash adjusting lever 223 in the counterclockwise direction. The follower pin 226a is therefore pressed on the rear end 204a of the inner lens cylinder 204.

In the structure described, when the pin 226c is brought into engagement with the cam 204b the distance A between the pivot 221 and the follower pin 226a is determined, while the distance B between the pivot 221 and the control pin 223b is always constant (see FIG. 5). By providing the compensation cam 204b whose position and shape are so defined as to effect compensation depending upon the displacement peculiar to the lens for which the compensation cam 204b is provided, the ratio of the distance B between the pivot 221 and control pin 223 to the distance A between the follower pin 226a and pivot 221, namely B/A, can be determined at an appropriate value for each lens. That is to say, it is so designed that B/A is great for a lens of small displacement while B/A is small for a lens of great displacement. In this case, the shape of the curve for each lens represented by the distance and displacement may be slightly different from one another depending upon the type of the lens, but in practical application as the automatic flash device, the difference is so small that it is negligible.

When the inner lens cylinder 204 is moved forward or backward by focusing, the compensation plate 226 moves vertically along the cam 204b and compensates for the distance A, the flash adjusting lever 223 pressing the arm 223d against the follower pin 226a thereby being pivotally moved by a rotational angle in accordance with the compensation value. Consequently, the position of the control pin 223b which controls the amount of rotation of the automatic flash cam lever 20 in contact with the cam portion 20a thereof is compensated, whereby the rotational displacement of the cam lever 20 and of diaphragm lever 15, and therefore the amount of diaphragm aperture reduction are properly adjusted. In the case where various interchangeable lenses are used which are different in photographing distance and in the axial displacement, the compensation cam 204b formed in the inner lens cylinder 204 at the proper position and provided with an appropriate shape serves to automatically provide a properly adjusted diaphragm aperture value for flash photography.

When photographs are taken in ordinary manner without using flash, the set lever 25 is operated to move the flash adjusting lever 223 clockwise as in the foregoing embodiments. The compensation lever 226, though included in the device, causes no trouble during this procedure. The switching operation of the set lever is carried out in the same manner as in the foregoing embodiments.

I claim:

1. An automatic diaphragm aperture adjusting device for flash photography in a camera with an interchangeable lens comprising flash adjusting means disposed in the camera body for detecting the displacement of the inner cylinder of said interchangeable lens and adapted to control the diaphragm aperture reducing operation of a diaphragm actuating member in a diaphragm operating mechanism of said lens in accordance with the displacement of the inner lens cylinder so as to make a diaphragm aperture value correspond to the displacement of said inner lens cylinder, said flash adjusting means including a member for detecting the displacement of the inner cylinder of said interchangeable lens, an operating member for reducing the diaphragm aperture of the lens in accordance with the displacement detected by said detecting member and a set lever for moving said detecting member into or out of engagement with said operating member, said set lever being adapted to be operated by an actuating portion provided externally of the camera body, a compensation cam provided in a portion of the inner cylinder of each of various interchangeable lenses which are different in displacement, said cam being formed in accordance with the displacement of each lens, and a compensation member provided with a follower pin whose position is determined by said compensation cam, said flash adjusting means being adapted to detect the displacement of the inner lens cylinder through the follower pin of said compensation member.

2. The device as claimed in claim 1 wherein the diaphragm actuating member in said diaphragm operating mechanism of the lens comprises a diaphragm lever in an automatic diaphragm operating mechanism of the camera.

3. An automatic diaphragm aperture adjusting device for flash photography in a camera provided with an interchangeable objective lens including an axially adjustable focussing lens barrel, a variable aperture diaphragm and a diaphragm aperture varying member which adjusts said variable aperture diaphragm, a sensing element mounted to the body of said camera and releaseably engaging and following said barrel and equally axially movable therewith, and means responsive to said sensing member for adjusting said diaphragm varying member in accordance with the axial adjustment of said barrel.

4. The device of claim 3 wherein said diaphragm adjusting means comprises a swingable first lever including a follower and carrying said sensing element and movable therewith, a swingable second lever having a cam engaging said follower and being responsive to the movement of said first lever, and coupled to said diaphragm to adjust said diaphragm aperture with said barrel axial movement.

5. An automatic diaphragm aperture adjusting device in a camera with exchangeable objectives comprising an exchangeable objective including; an axially movable lens cylinder; an adjustable aperture diaphragm; a diaphragm setting member for adjusting said diaphragm; connecting means provided at the rear end of said lens cylinder to adjust a diaphragm to a distance at the time of flash photography with said exchangeable objectives; and a camera body to be equipped with said exchangeable objectives including: a diaphragm actuating means to actuate said diaphragm setting member relative to shutter release means; a flash adjusting member releaseably engaging said connecting means; control means to control said diaphragm actuating means relative to said adjusting member; an ordinary photography setting means to disengage said connecting means of said exchangeable objectives from said control means relative to said flash adjusting member at the time of ordinary photography.

* * * * *